United States Patent
Roberts et al.

(10) Patent No.: US 7,257,117 B2
(45) Date of Patent: Aug. 14, 2007

(54) MAPPING ARBITRARY SIGNALS

(75) Inventors: Kim B. Roberts, Nepean (CA); Ronald J. Gagnon, Nepean (CA); Paul A. Smeulders, Ottawa (CA); Manoj Verghese, Ottawa (CA); Roland A. Smith, Nepean (CA); Nazib A. Moledina, Nepean (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 1037 days.

(21) Appl. No.: 10/124,235

(22) Filed: Apr. 18, 2002

(65) Prior Publication Data
US 2002/0159473 A1 Oct. 31, 2002

Related U.S. Application Data

(63) Continuation-in-part of application No. 09/349,087, filed on Aug. 7, 1999, now Pat. No. 7,002,986.

(51) Int. Cl.
H04L 12/56 (2006.01)
(52) U.S. Cl. ..................... 370/392; 370/475
(58) Field of Classification Search ........ 370/535–541, 370/465, 400–408
See application file for complete search history.

(56) References Cited

U.S. PATENT DOCUMENTS

| 4,791,652 | A | 12/1988 | McEachern et al. ........ 375/111 |
|---|---|---|---|
| 4,811,340 | A | 3/1989 | McEachern et al. ........ 370/102 |
| 4,928,275 | A | 5/1990 | Moore et al. ............... 370/102 |
| 5,784,594 | A | 7/1998 | Beatty ......................... 395/500 |
| 6,829,247 | B1 * | 12/2004 | Corkum et al. ............. 370/465 |
| 6,870,860 | B1 * | 3/2005 | Meagher et al. ........... 370/535 |
| 2002/0141456 | A1 * | 10/2002 | Wang et al. ................ 370/539 |
| 2002/0172225 | A1 * | 11/2002 | Ang et al. .................. 370/503 |
| 2002/0186724 | A1 * | 12/2002 | Bayer et al. ................ 370/529 |
| 2003/0031204 | A1 * | 2/2003 | Ho et al. ...................... 370/41 |

* cited by examiner

Primary Examiner—Chi Pham
Assistant Examiner—Thai Hoang
(74) Attorney, Agent, or Firm—Jeffrey M. Measures; Borden Ladner Gervais LLP

(57) ABSTRACT

A synchronizer/de-synchronizer maps continuous format signals of an arbitrary rate into frames of pre-selected single common rate, such as SONET frames, with no bits changed and very little jitter or wander added. In this way, the continuous format signal may be carried transparently as a tributary of a SONET network. Each frame comprises a definite number of fixed stuff bits, including transport overhead bits and reminder fixed stuff bits. A frame also comprises an adjustable number of adaptive stuff bits, resulting from the phase difference between the arbitrary rate and the common rate. A mapping function is performed in a tributary unit shelf of a SONET transport shelf, and the reverse mapping function is performed in a similar way at the far end of a SONET connection. The stuff bits are spread uniformly within the frame.

36 Claims, 10 Drawing Sheets

|   | 0 | 1 | 2 | 3 | ... | 126 | 127 | 128 |
|---|---|---|---|---|---|---|---|---|
| 1 | 1 | 2 | 3 | 4 | ... | 127 | 128 | 129 |
| 2 | 130 | 131 | 132 | 133 | ... | 256 | 257 | 258 |
| 3 | 259 | 260 | 261 | 262 | ... | 385 | 386 | 387 |
| 4 | 388 | 389 | 390 | 391 | ... | 514 | 515 | 516 |
| 5 | 517 | 518 | 519 | 520 | ... | 643 | 644 | 645 |
| 6 | 646 | 647 | 648 | 649 | ... | 772 | 773 | 774 |
| 7 | 775 | 776 | 777 | 778 | ... | 901 | 902 | 903 |
| 8 | 904 | 905 | 906 | 907 | ... | 1030 | 1031 | 1032 |

129 COLUMNS OF WORDS FOR 575-3NC

110 → TPOH 112, TPC 114

FIG. 4B

MAPPING ARBITRARY SIGNALS

RELATED APPLICATIONS

This patent application is a Continuation-In-Part application to U.S. patent application Ser. No. 09/349,087 entitled "Mapping Arbitrary Signals Into SONET" by Roberts, filed on Aug. 7, 1999, now U.S. Pat. No. 7,002,986 assigned to the assignee of the present invention and herein incorporated by reference.

BACKGROUND OF THE INVENTION

1. Field of the Invention

The invention is directed to transparent transportation of data signals with a continuous format, and in particular to a method for mapping arbitrary continuous signals into a SONET frame.

2. Background Art

Rapid provisioning of a customer's requested service is a valuable network function. There can be a large range of possible bit-rates for such services, or indeed the service and its bit-rate may not even have been defined when the network equipment is installed. Therefore, rapid provisioning of a service of arbitrary bit-rate is a valuable function.

Data transmission formats can be divided into SONET, other continuous formats, and burst formats. Burst formats do not have a continuous clock, transmission of such signals do not require any given phase relationship between bursts. On the other hand, the phase of the clock of continuous formats has continuity under normal conditions, and the frequency of the clock is bounded. Examples of such bounds are ±20 ppm (parts per million of the bit rate) and ±100 ppm.

The dominant signal format in the fiber optic networks follows the synchronous standard SONET in North America and SDH elsewhere. In this specification, SONET is defined to include SDH. SONET enables multiplexing, adding and dropping, and general transportation of signals. For a service, being able to be easily transported by a SONET network is a valuable attribute, in that it enables the network providers to make use of the large base of installed SONET-compatible equipment.

SONET is a physical carrier technology, which can provide a transport service for ATM, SMDS, frame relay, T1, E1, etc. As well, operation, administration, maintenance and provisioning (OAM&P) features of SONET provide the ability to reduce the amount of back-to-back multiplexing, and more importantly, network providers can reduce the operation cost of the network.

The SONET standards ANSI T1.105 and Bellcore GR-253-CORE, define the physical interface, optical line rates known as optical carrier (OC) signals, a frame format, and an OAM&P protocol. Opto/electrical conversion takes place at the periphery of the SONET network, where the optical signals are converted into a standard electrical format called the synchronous transport signal (STS), which is the equivalent of the optical signal. Namely, the STS signals are carried by a respective optical carrier, which is defined according to the STS that it carries. Thus, an STS-192 signal is carried by an OC-192 optical signal.

The STS-1 frame consists of 90 columns by 9 rows of bytes, the frame length is 125 microseconds. A frame comprises a transport overhead (TOH) occupying 3 columns by 9 rows of bytes, and a synchronous payload envelope (SPE) occupying 87 columns of 9 rows of bytes. The first column of the SPE is occupied by path overhead bytes.

As such, an STS-1 has a bit rate of 51.840 Mb/s. Lower rates are subsets of STS-1 and are known as virtual tributaries (VT), which may transport rates below DS3. Higher rates, STS-N, where N=1, 3, 12, ... 192 or higher, are built by multiplexing tributaries of a lower rate, using SONET add/drop multiplexers. An STS-N signal is obtained by interleaving N STS-1 signals. For example, an STS-192 is made of 192 STS-1 tributaries, each separately visible, and separately aligned within the envelope. The individual tributaries could carry a different payload, each with a different destination.

The STS-N has a TOH made of all N TOHs of the individual tributaries, and a SPE made of all N SPEs of the tributaries, each with its own POH.

Some services, that operate at a higher rate, are transmitted in an STS-Nc signal (c for concatenation). The STS-1s into the STS-Nc signal are kept together. The whole envelope of the STS-Nc signal is routed, multiplexed and transported as a single entity rather than as N individual entities. The TOH and the start of the SPE for the N constituents are all aligned, since all the constituents are generated by the same source, with the same clock. The first STS-1 in the concatenated signal carries the single set of POH, all that is required for an STS-Nc.

Mapping of one rate or format into another is well known. Bellcore TR-0253 describes in detail the standard mappings of the common asynchronous transmission formats (DS0, DS1, DS2, DS3, etc) into SONET. Similar mappings are defined for the ETSI hierarchy mapping into SDH. Optical transmission equipment has mapped one proprietary format into another. For example, FD-565 could carry Nortel's FD-135 proprietary format as well as the DS3 standard format.

However, the standards or proprietary schemes allow transportation of a very specific set of signals, with format specific hardware. These methods of mapping cannot be used to map rates that vary significantly from the standard. Furthermore, these mappings are each precisely tuned for a particular format and a particular bit-rate, with e.g. a ±20 ppm tolerance. If a signal has, for example, a bit rate even 1% different than that of a DS3, cannot be transported within SONET. In addition, a different hardware unit is generally required to perform the mapping of each kind of signal.

A solution to the above problem is to add a "wrapper" to an arbitrary continuous signal. The rate of the resulting signal is a function of the signal being wrapped. Namely, a 1 MBps wrapper added to a signal of rate X produces a format with rate X+1 Mb/s. A variation on this adds a percentage of X. For example, a common line coding 8B/10B produces a format with a rate of 125% of X. As such, the "wrapper" methods do not produce formats that have a pre-defined fixed bit rate for arbitrary inputs. The resulting signal cannot in general be time multiplexed to be transported on a high speed network.

U.S. Pat. No. 5,784,594 (Beatty) proposes a "TDM Wrapper" format where an arbitrary signal is mapped into as much of a frame as required, and the rest of the frame is left empty. However, this method requires a very large memory for each direction of conversion to hold the bits while waiting for the appropriate time slot to transmit them. As a result, this format is expensive to implement with high speed signals.

Packet or cell based formats map arbitrary input streams into SONET and SDH. While adequate for packet systems, these methods do not meet the jitter or wander requirements of most continuous signal formats due to the "one size fits all" mapping methods used. The clock phase information of the input signal is effectively eliminated in these methods, and so cannot be transmitted.

U.S. patent application Ser. No. 09/307812 (Solheim et al., entitled "Protocol Independent sub-rate device" filed on May 10, 1999 and assigned to Nortel Networks Corporation) discloses a method of transporting different type of clients (IP, ATM, SONET, Ethernet, etc.) together. The '812 application discloses time-multiplexing lower speed (subrate) channels of arbitrary rates and formats into a single higher speed channel, and then demultipexing the channels at the far end of the system. The portion of the bandwidth assigned to any given subrate channel can be provisioned without any change to the hardware or software. This significantly simplifies and speeds the provisioning of these services by the carrier. Tributaries with new protocols can be accommodated as well, significantly speeding up the delivery of support for these new protocols.

There remains a need for an efficient method and apparatus that will map arbitrary signals into SONET such that the signals can be recovered with low timing jitter at low cost.

SUMMARY OF THE INVENTION

It is an object of the present invention to map arbitrary signals having a continuous format into a container signal for transmission on a network According to a first broad aspect, the invention is a method for mapping a continuous format signal into at least one container signal to be transmitted via a network. The method includes distributing the bits of said continuous signal into a transparent envelope of length L words and inserting the transparent envelope within a payload of at least one container signal. In this aspect, the transparent envelope includes overhead information within at least words A, A+B, A+2B . . . A+(r−1)B, wherein A, B, r are integers and L is greater than or equal to rB.

In advantageous embodiments of the invention, A is equal to 1, B is equal to 129, r is equal to 8, L is equal to 1032 and each of the words have a length of 3N bytes, N being an integer. Further, advantageously the inserting the transparent envelope within a payload of at least one container signal comprises inserting a first portion of the transparent envelope within a payload of a first container signal and inserting a second portion of the transparent envelope within a payload of a second container signal.

According to a second broad aspect, the invention is an apparatus for mapping a continuous format signal into one or more container signal to be transmitted via a network. This apparatus includes a data recovery unit, a mapping unit and a container unit. The data recovery unit receives said continuous format signal and recovers a stream of data bits. The mapping unit receives said stream of data bits and distributes the bits of said continuous signal into a transparent envelope of length L words, the transparent envelope including overhead information within at least words A, A+B, A+2B . . . A+(r−1)B, wherein A, B, r are integers and L is greater than or equal to rB. The container unit for receives the transparent envelope and inserts the words of the transparent envelope within a payload of one or more container signals.

According to a third broad aspect, the invention is a data structure for transmitting a continuous format signal over a network. The data structure includes a container signal with a payload and at least a portion of a transparent envelope of length L with bits of said continuous signal distributed. The transparent envelope includes overhead information within at least words A, A+B, A+2B . . . A−(r−1)B, wherein A, B, r are integers and L is greater than or equal to rB. In this aspect, the payload of the container signal includes the at least a portion of the transparent envelope.

According to yet another broad aspect, the invention is a method for mapping a continuous format signal into a transparent envelope. The method includes distributing the bits of said continuous signal into a transparent envelope of length 1032 words, the transparent envelope including overhead information within at least words 1, 130 and 259, each of the words having a length of 3N bytes, N being an integer.

Other aspects and advantageous features of the present invention will become apparent to those ordinarily skilled in the art upon review of the following description of specific embodiments of the invention in conjunction with the accompanying figures.

BRIEF DESCRIPTION OF THE DRAWINGS

The foregoing and other objects, features and advantages of the invention will be apparent from the following more particular description of the preferred embodiments, as illustrated in the appended drawings, where:

FIG. 4B shows a Transparent Payload Envelope (TPE) that could be utilized within the STS-3Nc frame shown in FIG. 4A;

DESCRIPTION OF THE PREFERRED EMBODIMENT

The mapping system according to an embodiment of the invention maps a digital signal that has a constant line rate, up to the designated maximum capacity, into a SONET envelope of a provisioned size. A mapping function could be performed in a tributary unit of a SONET transport shelf, and the reverse mapping function (also called de-mapping) could be performed in a similar unit at the far end of a SONET connection.

Figure 1A:
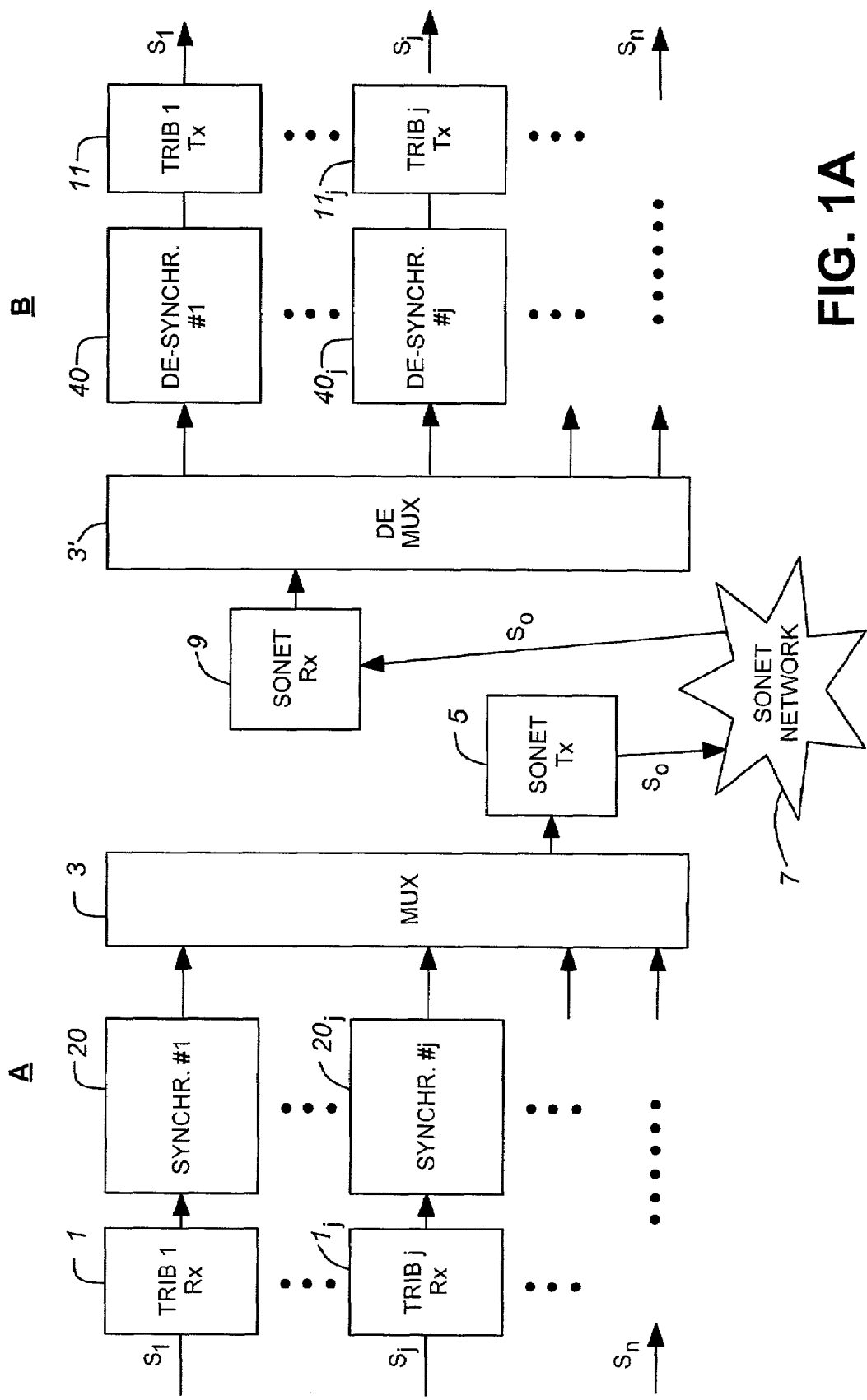
FIG. 1A is a block diagram of a communication network with the mapping system according to the invention.

FIG. 1A shows a block diagram of an exemplary transmission system with the mapping system according to the invention, transparently transporting a plurality of services over a SONET network. Only one direction of transmission, as shown by the arrows, is illustrated on this figure for simplification.

Signals $S_1, \ldots S_j, \ldots S_n$, where n is the number of the tributaries and j is the range of a tributary, are carried between two sites A and B into a SONET signal S, over a SONET network 7. Signals $S_1$-$S_n$ are digital signals of a continuous format, and are treated at the nodes A and B as tributaries of SONET signal S. We also note the rate of each signal $S_j$ with $R_j$ and the rate of signals S with R. Signals $S_j$ can carry the same or different type of services. Each trib receiver $1-1_n$ recovers the data bits for the respective continuous format signal $S_1$-$S_n$. Node A is provided with one or more synchronizers $20_1$-$20_n$, each synchronizer $20_j$ for mapping the data bits of corresponding trib signal $S_j$ into a SONET envelope of an appropriate size.

The size of the frame to carry transparently the continuous signals between certain transmission nodes is selected in software, and is provisioned having in view a satisfactory bandwidth usage for a large range of continuous format signals. For example, if a n×STS-12 is used for the envelope, n is between four and twenty for a high speed variant of the synchronizer, and between one and five for a medium speed variant. This avoids stranding significant network capacity.

After each signal was mapped into a respective SONET envelope, the tributaries are multiplexed by a SONET multiplexer 3 into a high rate signal S, which is launched by a SONET transmitter 5 over optical network 7 towards site B.

The reverse operation is performed at site B. Namely, the optical receiver 9 recovers the data in signal S, demultiplexer 3' separates the signals and presents them to a respective de-synchronizer 40-$40_n$. Each de-synchronizer $40_j$ re-arranges the bits in the respective format associated with the signal $S_j$, which is presented to a trib transmitter $11_j$. Each trib transmitter 11-11$_n$ launches the respective signal $S_1$-$S_n$ on the associated trib network, or to an associated end user.

An example of a mapping algorithm is provided next for an STS-192c signal, for showing the basic concepts and the feasibility. Other envelopes can also be used, the invention not being limited to the STS-192c signals.

Figure 1B:
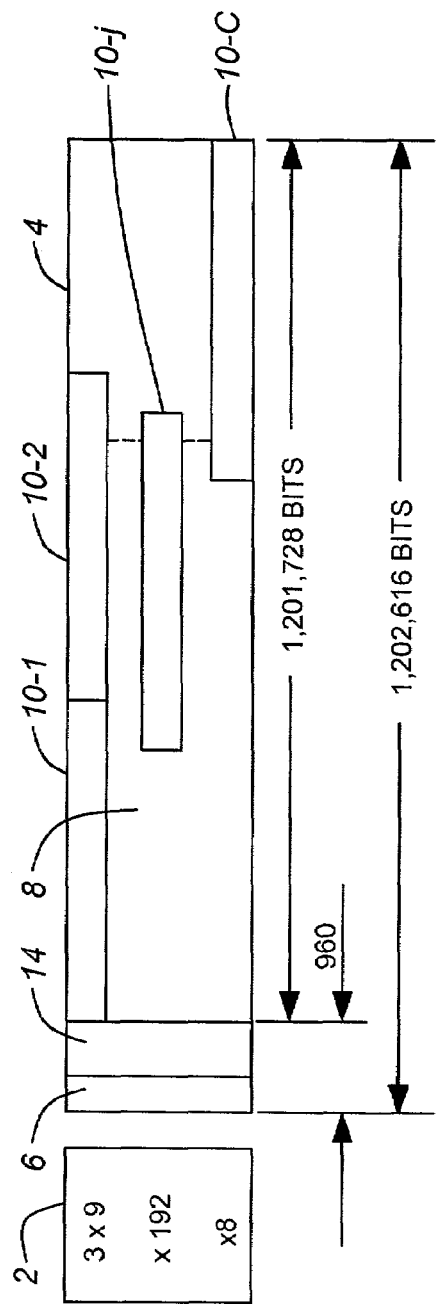
FIG. 1B is an OC-192c frame, showing the blocks according to an embodiment of the invention.

FIG. 1B shows an STS-192c frame 1, comprising TOH 2, and the STS-192c SPE (synchronous payload envelope) 4. The payload comprises 192×87×9×8=1,202,688 bits.

A block 10-j is defined herein as a 1056-bit field, which comprises data bits, fixed stuff bits and adaptive stuff bits, as it will be seen later. An STS-192 SPE can accommodate 1138 such blocks 10-1 to 10-K (where K=1138), that occupy the area shown in grey and designated by reference numeral 8. Block field 8 has 1,201,728 bits. The remaining 960 bits in the envelope 4 are comprised by the POH bits 6 (9*8=72 bits) and a remainder field 14 of 888 bits. The number of the bits in fields 6 and 14, is unchanged, irrespective of the rate R1 of the continuous format signal mapped into the SONET frame 1. Therefore, these bits are called in the following fixed stuff bits.

On the other hand, the number of stuff bits necessary to fill the block field 8 varies function of the rate R1 of the continuous format signal S1. These stuff bits are called herein adaptive stuff bits.

According to an embodiment of the invention, the data bits of the signal S1 are mapped into frame 1 with evenly interspersed fixed stuff bits and adaptive stuff bits. These stuff bits are distributed uniformly within each block, on the fly, since the rate R1 may not be known in advance. Therefore, the synchronizer defines a valid location, that is a location for a data bit, and an invalid location, that is a location for a stuff bit for the next block, based on phase information accumulated when the data bits of the current block are mapped. In addition, the synchronizer also distributes evenly the overhead bits at the time of the actual mapping, but realigns these in the timeslots provided according to the SONET standard after mapping operation, so that the frame is recognized by the SONET equipment. At the far end, the synchronizer effects the reverse operation, by absorbing the fixed stuff bits and the adaptive stuff bits, so that the data bits can be reverse-mapped to regenerate S1.

It is to be noted that FIG. 1B shows the structure of a frame intuitively; in accordance with an embodiment of this invention the mapping algorithm distributes the fixed stuff bits and the adaptive stuff bits uniformly within the frame 1. We also note that the above calculations are applicable to a STS-192c frame; similar consideration apply to other SONET signals.

Figure 1C:
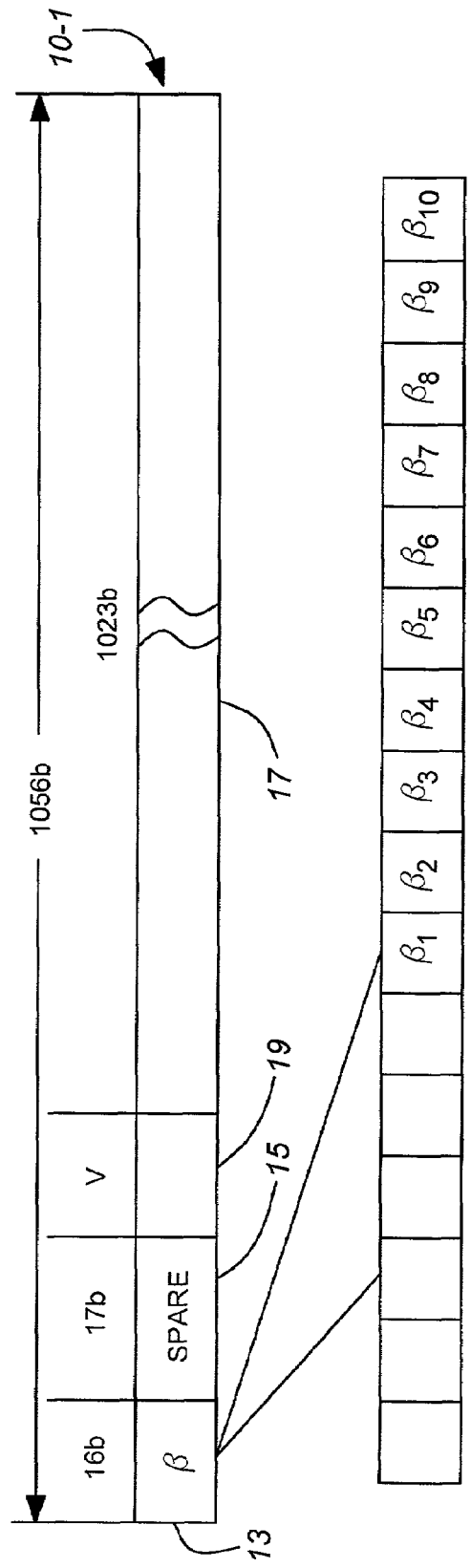
FIG. 1C shows an example of the structure of a block.

The bits in each block are allocated as shown in FIG. 1C. A block 10-1 comprises a data field 17 having 1023 ($2^{10}-1$) bits for data, a control field 13 having 16 bits, and a spare field 15 having 17 bits for future use.

The 1023 bits of field 17 provide a bit rate of 9,313,392 Mbps (1023×1138×8000) for transportation of the data into a STS-192c frame. The size of the frame is provisioned and fixed for a certain application, i.e. tributaries of arbitrary rates are mapped in frames of a same size. The mapping technique is adaptive for any trib, rather than a different frame being used for every trib. If a trib has a lower rate than 9,313,392 Mbps, it must be justified into the STS-192c, changing more of the bits of data field 8 into stuff bits. FIG. 1C illustrates field 19 within field 17, of a variable size v, which size is determined during mapping by comparing the phase between the clock of signals S1 to that of signal S.

Field 13 comprises a 10-bit control function β. The size of β was selected in accordance with the size of the block, so as to uniquely determine the position of valid bits in the next block, according to the adaptive stuffing algorithm below. A 10-bit number can assume 1024 values, which is one more than the size of a block. The value of β also gives the number of the valid bits in the next block. The additional 6 bits of field 13 are necessary for single bit error correction and multiple error detection.

In case of detection of multiple errors, the β from the previous block is used as the default, for fast reframing downstream with a minimal PLL transient. The bits of fields 15 and 19 are interspersed within the block.

The value of β may change between adjacent blocks, as not all blocks have the same number of adaptive stuff bits, but β remains constant within each block.

The adaptive stuffing algorithm defines the binary bit reversal of β which is denoted with α. That is, the most significant bit of β becomes the least significant bit of α; similarly the least significant bit of α becomes the most significant bit of β. Table 1 details this translation by way of examples.

TABLE 1

Determination of α

| β | | | | | | | | | | α | | | | | | | | | |
|---|---|---|---|---|---|---|---|---|---|---|---|---|---|---|---|---|---|---|---|
| $β_1$ | $β_2$ | $β_3$ | $β_4$ | $β_5$ | $β_6$ | $β_7$ | $β_8$ | $β_9$ | $β_{10}$ | $β_{10}$ | $β_9$ | $β_8$ | $β_7$ | $β_6$ | $β_5$ | $β_4$ | $β_3$ | $β_2$ | $β_1$ |
| 0 | 0 | 0 | 0 | 0 | 1 | 1 | 1 | 1 | 1 | 1 | 1 | 1 | 1 | 1 | 0 | 0 | 0 | 0 | 0 |
| 1 | 0 | 1 | 0 | 1 | 0 | 1 | 0 | 1 | 0 | 0 | 1 | 0 | 1 | 0 | 1 | 0 | 1 | 0 | 1 |
| 0 | 1 | 1 | 1 | 0 | 0 | 1 | 0 | 0 | 0 | 0 | 0 | 0 | 1 | 0 | 0 | 1 | 1 | 1 | 0 |

α is also determined on a per block basis, and as in the case of β, the value of α may change between the adjacent blocks but does not change within a block.

Also defined herein is a counter C, and a value D. C is the counter of bits in a block, and is represented by a 10 bits binary number. C increments from 1 to 1023, and as such identifies the timeslot occupied by a bit in the block.

D is the bit-wise transition delta of C, and is represented by a 10 bit binary number with exactly one bit set. This set bit is in the position of a 0-to-1 transition that occurs when counter C advances with one bit. Using Boolean functions, each bit of D is given by the bits of range n and n−1 of counter C, according to the equation:

$$D_n = C_n \text{ AND NOT } (C-1)_n \qquad \text{EQ1}$$

Table 2 gives examples of the values assumed by D for a given value of C.

TABLE 2

Determination of D for a given C

| | $C_{1,2...n}$ Counter of bits in the block | | | | | | | | | | $D_{1,2...n}$ Bit-wise transition Δ of C | | | | | | | | | |
|---|---|---|---|---|---|---|---|---|---|---|---|---|---|---|---|---|---|---|---|---|
| | $C_1$ | $C_2$ | $C_3$ | $C_4$ | $C_5$ | $C_6$ | $C_7$ | $C_8$ | $C_9$ | $C_{10}$ | $D_1$ | $D_2$ | $D_3$ | $D_4$ | $D_5$ | $D_6$ | $D_7$ | $D_8$ | $D_9$ | $D_{10}$ |
| C − 1 | 1 | 0 | 0 | 0 | 0 | 0 | 0 | 0 | 0 | 0 | 1 | 0 | 0 | 0 | 0 | 0 | 0 | 0 | 0 | 0 |
| C | 1 | 0 | 0 | 0 | 0 | 0 | 0 | 0 | 0 | 1 | 0 | 0 | 0 | 0 | 0 | 0 | 0 | 0 | 0 | 1 |
| C + 1 | 1 | 0 | 0 | 0 | 0 | 0 | 0 | 0 | 1 | 0 | 0 | 0 | 0 | 0 | 0 | 0 | 0 | 0 | 1 | 0 |
| C + 2 | 1 | 0 | 0 | 0 | 0 | 0 | 0 | 0 | 1 | 1 | 0 | 0 | 0 | 0 | 0 | 0 | 0 | 0 | 0 | 1 |

In order to spread stuff bits more or less evenly among valid data in the block, the adaptive stuffing algorithm according to the invention states that a bit is valid when a bit in D is also set in α.

This can be described as in Eq2, for the $C^{th}$ bit of a block:

$$\text{Valid}(C, \beta), \text{ if any bit of } (\alpha_{1,2...n} \text{ AND } D_{1,2...n}) \text{ is non zero} \qquad \text{Eq2}$$

A valid bit corresponds to a bit which is assigned to data, and consequently an invalid bit corresponds to a stuff bit. Table 3 shows a simple example of how the algorithm works for a block with 7 bits, for which size of β is 3 bits. It is to be understood that the algorithm operates in a similar way for blocks of 1023 bits and a 10-bit β, but it is impractical to detail the full stuffing sequences in this specification.

The entries in Table 3 are the result of the binary function Valid(C, β). The columns illustrate how data and stuff bits are interspersed for a particular number of valid bits in the block, as given by β.

For each value of C where Valid(C) is true, a valid data bit is present in the timeslot identified by C, for each untrue value of Valid(C), a stuff bit is placed into the timeslot. Using this scheme, the invalid stuffing bits are spread almost uniformly through the frame.

TABLE 3

Example of flexible mapping for a 7-bit block, for a 3-bit β

| | | β | 000 | 001 | 010 | 011 | 100 | 101 | 110 | 111 |
|---|---|---|---|---|---|---|---|---|---|---|
| | | α | 000 | 100 | 010 | 110 | 001 | 101 | 011 | 111 |
| | C | D | Valid(C,0) | Valid(C,1) | Valid(C,2) | Valid(C,3) | Valid(C,4) | Valid(C,5) | Valid(C,6) | Valid(C,7) |
| 1 | 001 | 001 | Stuff | Stuff | Stuff | Stuff | Data | Data | Data | Data |
| 2 | 010 | 010 | Stuff | Stuff | Data | Data | Stuff | Stuff | Data | Data |
| 3 | 011 | 001 | Stuff | Stuff | Stuff | Stuff | Data | Data | Data | Data |
| 4 | 100 | 100 | Stuff | Data | Stuff | Data | Stuff | Data | Stuff | Data |
| 5 | 101 | 001 | Stuff | Stuff | Stuff | Stuff | Data | Data | Data | Data |
| 6 | 110 | 010 | Stuff | Stuff | Data | Data | Stuff | Stuff | Data | Data |
| 7 | 111 | 001 | Stuff | Stuff | Stuff | Stuff | Data | Data | Data | Data |

In this example, counter C counts from 1 to 7 and D is evaluated in the respective column, for all values of C. Each value of D, as C increments, is then compared with α. If the set bit in D is also set in α, the corresponding $C^{th}$ bit in the block will be a data bit. If the set bit in D is not set in α, the corresponding $C^{th}$ bit in the block will be a stuff bit.

Let's take as an example a block where the bit rate R1/R is $5/7^{th}$ of the available capacity, which means that β is binary 5(101), and α, the binary bit reversal of β, is also 5(101). The sequence of data and stuff bits in the block is as per column Valid(C,5) and is:

Data, Stuff, Data, Data, Data, Stuff, Data

It is also apparent on Table 3 that for Valid (C,5)β, which is five, is also the number of valid bits, and the invalid bits are spread almost uniformly through the frame.

Table 4 details the stuffing sequence for 5 consecutive blocks, with a slightly different β between blocks. In this Table, counter C counts from 1 to 7, and two consecutive blocks are shown with a different background (grey and white) for clarity.

In this case, the spreading of stuff bits among data bits is as follows:

DSDDDSD DDDSDDD DSDDDSD DSDDDSD DDDSDDD where D stands for data, and S for Stuff. To avoid confusion between D and S above, they are written in regular characters, while italic characters are used for signals S, and for D, bit-wise transition Δ of C.

It is again evident from Table 4 that the stuff bits are spread more or less evenly among the data bits, even with a slight variation of β.

Figure 2:
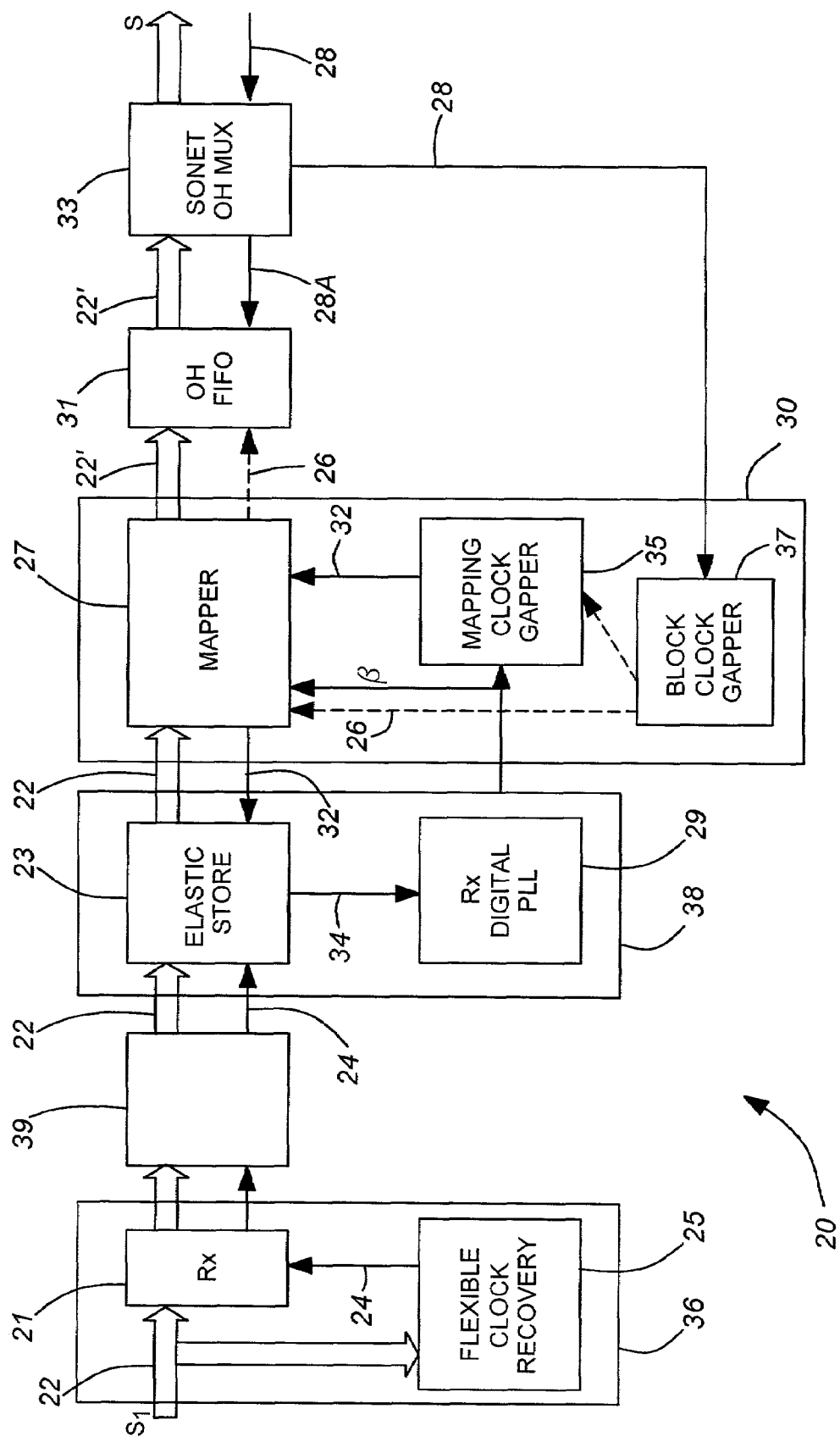
FIG. 2 illustrates a block diagram for a synchronizer according to an embodiment of the invention.

FIG. 2 illustrates a block diagram of a trib synchronizer 20. Transparency is obtained as discussed above, by filling a SONET SPE with data received at an arbitrary rate. The data path is illustrated using wide arrows, and reference numerals 22 and 22'. Signal $S_1$, of a continuous format and rate R1 is detected by a data recovery unit 36. The data bits then pass through a fill control unit 38, a mapping unit 30, a receiver overhead FIFO (first-in, first-out) 31, and an

TABLE 4

Adaptive Stuff algorithm for five consecutive 7-bit blocks.

| | | β | 000 | 001 | 010 | 011 | 100 | 101 | 110 | 111 |
|---|---|---|---|---|---|---|---|---|---|---|
| | | α | 000 | 100 | 010 | 110 | 001 | 101 | 011 | 111 |
| C | D | | Valid(C,0) | Valid(C,1) | Valid(C,2) | Valid(C,3) | Valid(C,4) | Valid(C,5) | Valid(C,6) | Valid(C,7) |
| 1 | 001 | 001 | Stuff | Stuff | Stuff | Stuff | Data | Data | Data | Data |
| 2 | 010 | 010 | Stuff | Stuff | Data | Data | Stuff | Stuff | Data | Data |
| 3 | 011 | 001 | Stuff | Stuff | Stuff | Stuff | Data | Data | Data | Data |
| 4 | 100 | 100 | Stuff | Data | Stuff | Data | Stuff | Data | Stuff | Data |
| 5 | 101 | 001 | Stuff | Stuff | Stuff | Stuff | Data | Data | Data | Data |
| 6 | 110 | 010 | Stuff | Stuff | Data | Data | Stuff | Stuff | Data | Data |
| 7 | 111 | 001 | Stuff | Stuff | Stuff | Stuff | Data | Data | Data | Data |
| 1 | 001 | 001 | Stuff | Stuff | Stuff | Stuff | Data | Data | Data | Data |
| 2 | 010 | 010 | Stuff | Stuff | Data | Data | Stuff | Stuff | Data | Data |
| 3 | 011 | 001 | Stuff | Stuff | Stuff | Stuff | Data | Data | Data | Data |
| 4 | 100 | 100 | Stuff | Data | Stuff | Data | Stuff | Data | Stuff | Data |
| 5 | 101 | 001 | Stuff | Stuff | Stuff | Stuff | Data | Data | Data | Data |
| 6 | 110 | 010 | Stuff | Stuff | Data | Data | Stuff | Stuff | Data | Data |
| 7 | 111 | 001 | Stuff | Stuff | Stuff | Stuff | Data | Data | Data | Data |
| 1 | 001 | 001 | Stuff | Stuff | Stuff | Stuff | Data | Data | Data | Data |
| 2 | 010 | 010 | Stuff | Stuff | Data | Data | Stuff | Stuff | Data | Data |
| 3 | 011 | 001 | Stuff | Stuff | Stuff | Stuff | Data | Data | Data | Data |
| 4 | 100 | 100 | Stuff | Data | Stuff | Data | Stuff | Data | Stuff | Data |
| 5 | 101 | 001 | Stuff | Stuff | Stuff | Stuff | Data | Data | Data | Data |
| 6 | 110 | 010 | Stuff | Stuff | Data | Data | Stuff | Stuff | Data | Data |
| 7 | 111 | 001 | Stuff | Stuff | Stuff | Stuff | Data | Data | Data | Data |
| 1 | 001 | 001 | Stuff | Stuff | Stuff | Stuff | Data | Data | Data | Data |
| 2 | 010 | 010 | Stuff | Stuff | Data | Data | Stuff | Stuff | Data | Data |
| 3 | 011 | 001 | Stuff | Stuff | Stuff | Stuff | Data | Data | Data | Data |
| 4 | 100 | 100 | Stuff | Data | Stuff | Data | Stuff | Data | Stuff | Data |
| 5 | 101 | 001 | Stuff | Stuff | Stuff | Stuff | Data | Data | Data | Data |
| 6 | 110 | 010 | Stuff | Stuff | Data | Data | Stuff | Stuff | Data | Data |
| 7 | 111 | 001 | Stuff | Stuff | Stuff | Stuff | Data | Data | Data | Data |
| 1 | 001 | 001 | Stuff | Stuff | Stuff | Stuff | Data | Data | Data | Data |
| 2 | 010 | 010 | Stuff | Stuff | Data | Data | Stuff | Stuff | Data | Data |
| 3 | 011 | 001 | Stuff | Stuff | Stuff | Stuff | Data | Data | Data | Data |
| 4 | 100 | 100 | Stuff | Data | Stuff | Data | Stuff | Data | Stuff | Data |
| 5 | 101 | 001 | Stuff | Stuff | Stuff | Stuff | Data | Data | Data | Data |
| 6 | 110 | 010 | Stuff | Stuff | Data | Data | Stuff | Stuff | Data | Data |
| 7 | 111 | 001 | Stuff | Stuff | Stuff | Stuff | Data | Data | Data | Data |

As indicated above, β is set for each block, but may vary between subsequent blocks, since the ratio between the total number of stuff bits and the number of blocks may not be an integer. Let's consider the following example:

block 1 (grey) has a β of 5
block 2 (black) has a β of 6
block 3 (grey) has a β of 5
block 4 (black) has a β of 5
block 5 (grey) has a β of 6 overhead multiplexer 33. The signal output by synchronizer 20 is now in a SONET frame. It is to be understood that signal S has a SONET-type overhead (TOH and POH) with the respective OAM&P information, and has a SONET rate R, while the placement of the bits into the synchronous payload is according to the mapping algorithm rather that to the SONET standard.

Synchronizer 20 manipulates four different clocks: a data clock 24, a block clock 26, a mapping clock 32 and SONET clocks 28 and 28A. Clock 28 has the STS-192 rate and clock 28A has the rate of the frame. The data clock 24 (rate R1) is recovered from the incoming data by data recovery unit 36 which comprises a receiver 21 and a flexible clock recovery circuit 25. Flexible clock recovery circuit 25 is capable of clock recovery over a broad continuous range of bit-rates. An example of such a circuit is disclosed in the co-pending U.S. patent application Ser. No. 09/218053 filed on Dec. 22,1998, entitled "Apparatus and Method for Versatile Digital Communication, by Habel et al., assigned to Northern Telecom Limited. Patent application '053 is incorporated herein by reference.

A certain set of known signal formats could be recognized by an off-line framer 39, shown in dotted lines on FIG. 2, and frame and BER performance information reported. Also, line coding could be removed from some signals at the receiver and added on at the transmitter, for better efficiency in mapping. These options depend on the particular type of service, and therefore are not discussed in further detail here.

A receiver buffer unit 38 comprises an elastic store 23 and a receiver digital PLL 29. The data clock 24 is used to clock the input of data into elastic store 23, which is emptied under control of mapping clock 32. Mapping clock 32 is a gapped clock, derived from the STS-192 clock 28. This clock is discontinued at appropriate phase instants as determined by the mapping algorithm, in addition to the gaps in the block clock. In this way, data 22 is synchronized to the mapping frequency at the input of mapper 27.

If the payload field 4 were filled continuously with data bits to the capacity required, and the remaining capacity were a continuum of stuff bits, the elastic store 23 fill would vary widely, requiring a rather large depth for the store 23. The elastic store 23 would fill rapidly while stuff bits are loaded, emptying rapidly while a continuous stream of trib data bits are loaded. This situation is avoided in the configuration of FIG. 2, where the elastic store 23 is emptied at substantially regular intervals by mapping clock 32.

On the other hand, the elastic store 23 must be sufficiently deep to absorb all input jitter and wander from the trib. If the fill of the elastic store 23 is sufficiently well controlled, it can be guaranteed never to overflow or underflow even in the presence of worst-case jitter and wander, and the synchronizer 20 will still meet jitter tolerance requirements. Experimentally, the minimum size of the elastic store 23 was determined at 256 bits.

Receiver digital PLL 29 controls the rate at which the elastic store is emptied to maintain the optimal fill by way of β which determines the mapping clock 32. In other words, the average rate of mapping clock 32 is controlled to track the average rate of data clock 24 β and results from the phase difference between these clocks. As indicated above, β controls filling of the next block. This control has the advantage that the synchronizer 20 does not need a pointer adjustment as per SONET standard. Rather, control of the elastic store fill ameliorates any line and trib rate variations with time (line and trib jitter and wander), as long as the maximum trib rate never exceeds the payload rate.

To determine β, the input to the elastic store 23 is sampled periodically and phase information on data 22 is input to PLL 29. The digital PLL 29 may for example comprise a 24-bit accumulator. At the start of the block, the fill of the elastic store 23 given by counter C of mapper 27 is latched relative to e.g. 50%. Then, the phase of sample 34 is incremented into the accumulator and added to the phase left- shifted by 3 bits. The upper 10 bits of this sum S is β. The accumulator must be clipped at FFFFFF to not roll-over, and clipped at a lowest value such as 400000 to reflect the low frequency limit of the analog output PLL range. Other implementations of digital PLL are also possible.

If the elastic store 23 starts to overfill, β would be increased to empty the store by speeding-up the mapping clock 32. Similarly, if store 23 begins to empty, β would be decreased to allow store 23 to fill. The target fill is preferably 50%.

Mapping unit 30 comprises a block clock gapper 37, a mapping clock gapper 35 and a mapper 27.

Block clock gapper 37 receives the STS-192 clock 28 which features gaps and regular cycles accounting for SONET TOH. Clock 28 generates the block clock 26, which has in the above example 1138 (number of blocks)*1056 (size of a block)=1,201,728 cycles per SONET frame, with 42,432 gaps spread evenly through the frame. As indicated above, the gaps of the block clock 26 are due to the SONET overhead, namely field 2 in FIG. 1B, whose size is 3×9×8× 192, and to the fixed stuffing, namely fields 6 and 14, whose size is 960. Block clock 26 represents the total allocation of bits in field 8. In other words, block clock 26 is discontinued at approximately every $30^{th}$ bit to keep room for the TOH bits, POH bits and the fixed stuff bits, in the case when the overhead size of the frame is according to the SONET standard.

Mapping clock gapper block 35 has the same rate as the block clock, but is further gapped under control of β, as described above, with a pulse at every valid bit location, to further account for the adaptive stuff bits resulted from the difference between rates R1 and R.

Mapper 27 takes mapping clock 32, block clock 26 and some other complementary clocks, not shown for simplicity, and justifies data 22 using both fixed and adaptive stuff bits. The data bits are clocked out from elastic store 23 into the mapper using mapping clock 32. The data bits, fixed and adaptive stuff bits are clocked out from mapper 27 using block clock 26. The mapper 27 has essentially no memory, the elastic store 23 and the FIFO 31 representing all the memory of the synchronizer.

The bits from mapper 27 denoted with reference numeral 22', as they comprise data, fixed and adaptive stuff bits, are clocked into the receiver overhead FIFO (first-in first-out) 31, which reserves timeslots for the SONET overhead locations. Next, bits 22' are clocked out of FIFO 31 with clock 28A, whereby FIFO 31 is reset synchronously once each frame. The depth of FIFO 31 has only to be sufficient to store payload bits during the phase instants of the frame when frame OH is being clocked into the OH MUX. If the frame has the same OH to payload ratio as SONET, this depth must be greater than 192×8×9×3 bits, and is preferably larger than 192×8×12×3 bits.

From FIFO block 31, bits 22' are clocked into the SONET overhead multiplexer 33 where the SONET overhead is added in the respective empty timeslots and the signal is then treated as an STS-192. The SONET clocks 28 and 28A, shown in thin lines, are locked to the rest of the shelf, in the usual manner.

A serial hardware implementation is described for simplicity. Parallel implementations of this kind of mapping, such as byte wide implementations can obtain lower clock speeds. These parallel implementations can have staggered block alignments for reduced jitter. DSP control rather than hardware control would give greater freedom to optimize the PLLs.

Figure 3:
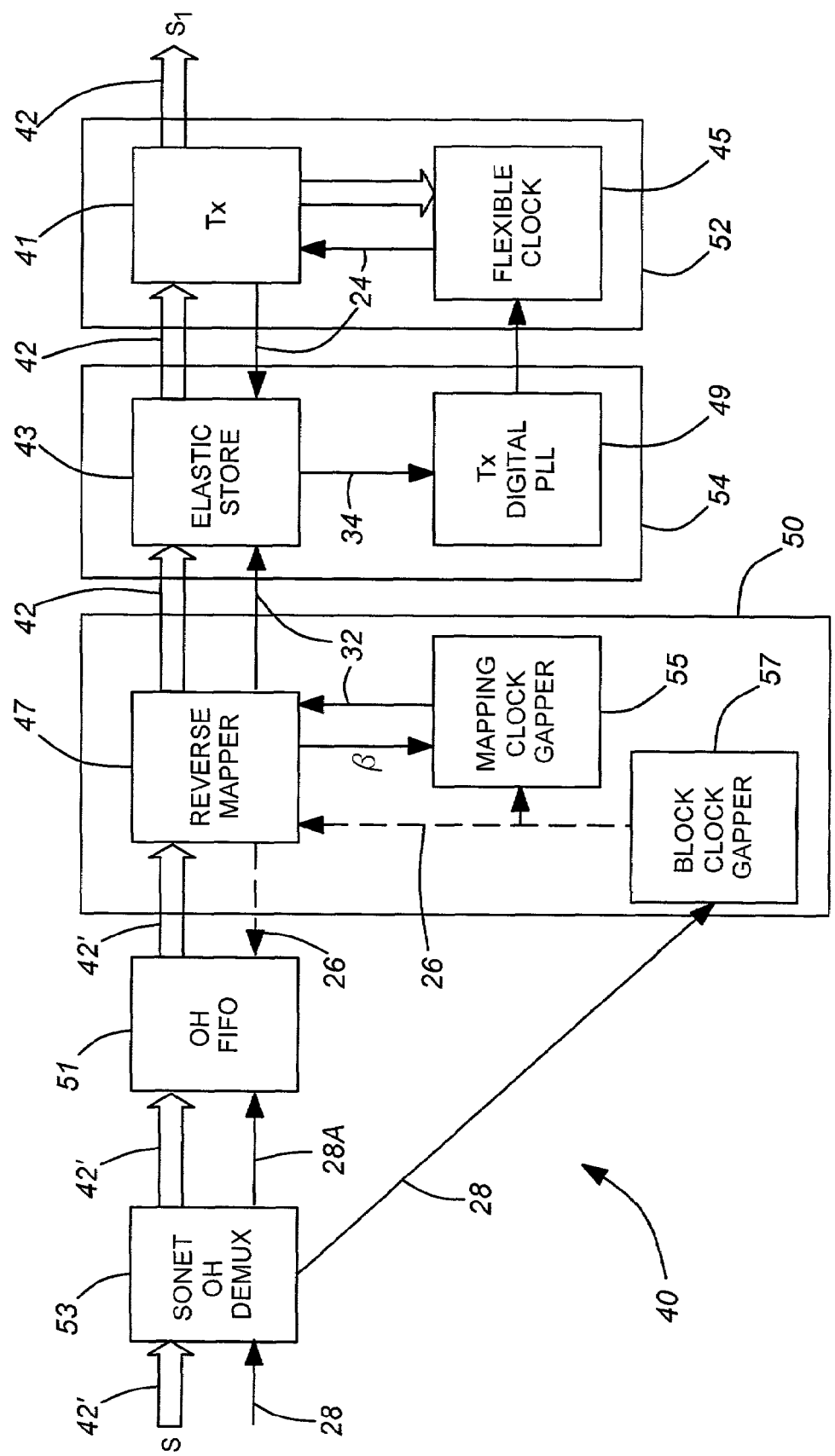
FIG. 3 shows a block diagram for a de-synchronizer according to an embodiment of the invention.

FIG. 3 shows the block diagram of the transmitter side of the transparent reverse synchronizer, or desynchronizer 40. The desynchronizer 40 performs the inverse function performed by the synchronizer 20, in a very similar manner, and is provided with similar blocks.

A SONET overhead demultiplexer 53 delineates the SONET overhead from signal 42' using STS-192 clock 28, which is locked to the rest of the shelf in the usual manner. A transmitter overhead FIFO 51 is reset synchronously once each frame with clock 28A. Overhead FIFO 51 absorbs overhead locations so as to present to the mapper 47 the data 42' received in the payload, comprising data bits together with the fixed stuff bits and adaptive stuff bits.

If pointer adjustment is not considered, the transmitter OH FIFO 51 could have a similar depth with that of receiver OH FIFO 31 of synchronizer 20. For example, if the SONET OH is used for the frame, the required depth is, as in the case of FIFO 31, 192×8×12×3 bits. FIFO could thus store sufficient data bits so that transmitter OH FIFO 51 is not emptied during the frame phase when the OH is being demultiplexed from the bit stream. However, as pointer alignment is necessary for the desynchronizer, the transmitter OH FIFO 51 must have additional depth to tolerate the worst-case series of positive or negative pointer adjustment events.

A reverse mapping unit 50 comprises a reverse mapper 47, a mapping clock gapper 55, and a block clock gapper 57.

The block clock gapper 57 gaps the STS-192 clock 28 to create block clock 26. Block clock 26, as in the case of the synchronizer 20, has 1,201,728 cycles per frame, with 42,432 gaps spread evenly across the frame. The gaps account for fields 2, 6 and 14 of FIG. 1B. In other words, this clock rejects the TOH and the fixed stuff bits.

Block clock gapper 57 of the desynchronizer also includes/deletes gaps for pointer adjustments. These inclusions must be spread out for three frames to minimize the phase hit from a pointer adjustment.

Mapping clock gapper 55 receives the block clock 26 and b, read from an in-band OH channel within the block. Using b, gapped clock 26 is further gapped to produce the mapping clock 32. Mapping clock 32 gaps-out data bits 42' so that strictly trib data bits 42 are clocked out.

Bits 42 are next processed by a transmitter buffer unit 54, which comprises an elastic store 43 and a transmitter digital PLL 49. The trib data bits 42 are clocked into the output elastic store 43 using mapping clock 32. The elastic store 43 is emptied by the data clock 24, output by the flexible clock recovery circuit 45.

The phase of the output elastic store 43 is sampled periodically by the transmitter digital PLL. The sample 34 is processed digitally, and an output signal passed to the flexible clock circuit 45, to control the voltage of the VCO. The flexible clock circuit 45 is of a similar type with the flexible clock circuit 25 of the synchronizer, and provides data clock 24.

The bandwidth of the Tx PLL 49 must be as low as possible to filter out jitter from the mapping and from pointer adjustments, and yet high enough to suppress the VCO noise.

Figure 4A:
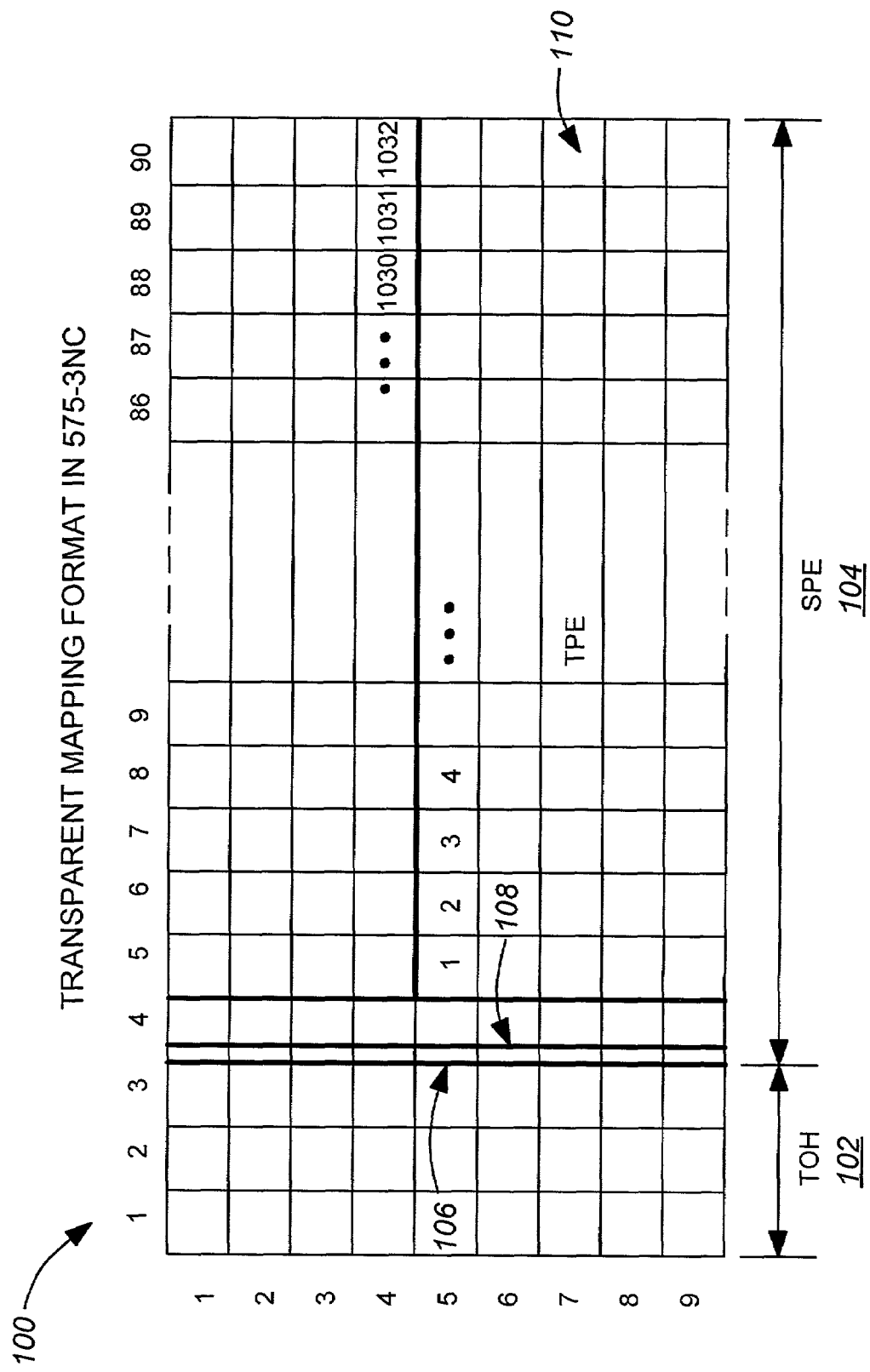
FIG. 4A is an STS-3Nc frame according to an alternative embodiment of the invention.

An alternative embodiment of the SONET frame of FIG. 1B that could be utilized with the invention is now described with reference to FIGS. 4A through 4E. FIG. 4A shows an STS-3Nc frame 100 comprising a Transport Overhead (TOH) 102 and an STS-3Nc Synchronous Payload Envelope (SPE) 104. The SPE 104 comprises 87 columns ×9 rows of words, each word being equal to 3N bytes for the case of an STS-3Nc frame. In this embodiment, the first column of the SPE (column 4 of the STS-3Nc frame) includes a Path Overhead (POH) 106 as well as a Transparent Fixed Overhead (TFOH) 108 as is described herein below with reference to FIG. 4E. The remainder of the SPE 104 (column 5 through 90 of the STS-3Nc frame) comprises portions of one or more Transparent Payload Envelopes (TPE) 110.

In the embodiment illustrated in FIG. 4A, the TPE 110 uses a floating frame format to carry both data and timing information. In other embodiments, the TPE 110 could be either contiguous or virtually concatenated SPEs 104 which are multiples of STS-3 such as STS-3Nc or STS-3c-Nv. The floating format in the embodiment of FIG. 4A enables this format to further support contiguous or virtually concatenated STS-Nc or STS-1c-Nv signals which require SONET SPE columns 30 and 59 to be reserved as "stuff columns". The floating frame format further enables future versions of the TPE 110 to have various word sizes and not be limited to the word sizes of 3N bytes as described below.

FIG. 4B illustrates an embodiment for the TPE 110 of FIG. 4A. As depicted, the TPE 110 comprises 129 columns (numbered 0 to 128) by 8 rows (numbered 1 to 8) of words, each word being 3N bytes wide for the case of an STS-3Nc frame. When the TPE 110 is transmitted, words of 3N bytes are transmitted left to right, most significant bit first from 1 ... 1032 starting at (column 0, row 1) and ending at (column 128, row 8). It is noted that this format is significantly different from the SONET format, which has 90 columns by 9 rows.

Figure 4C:
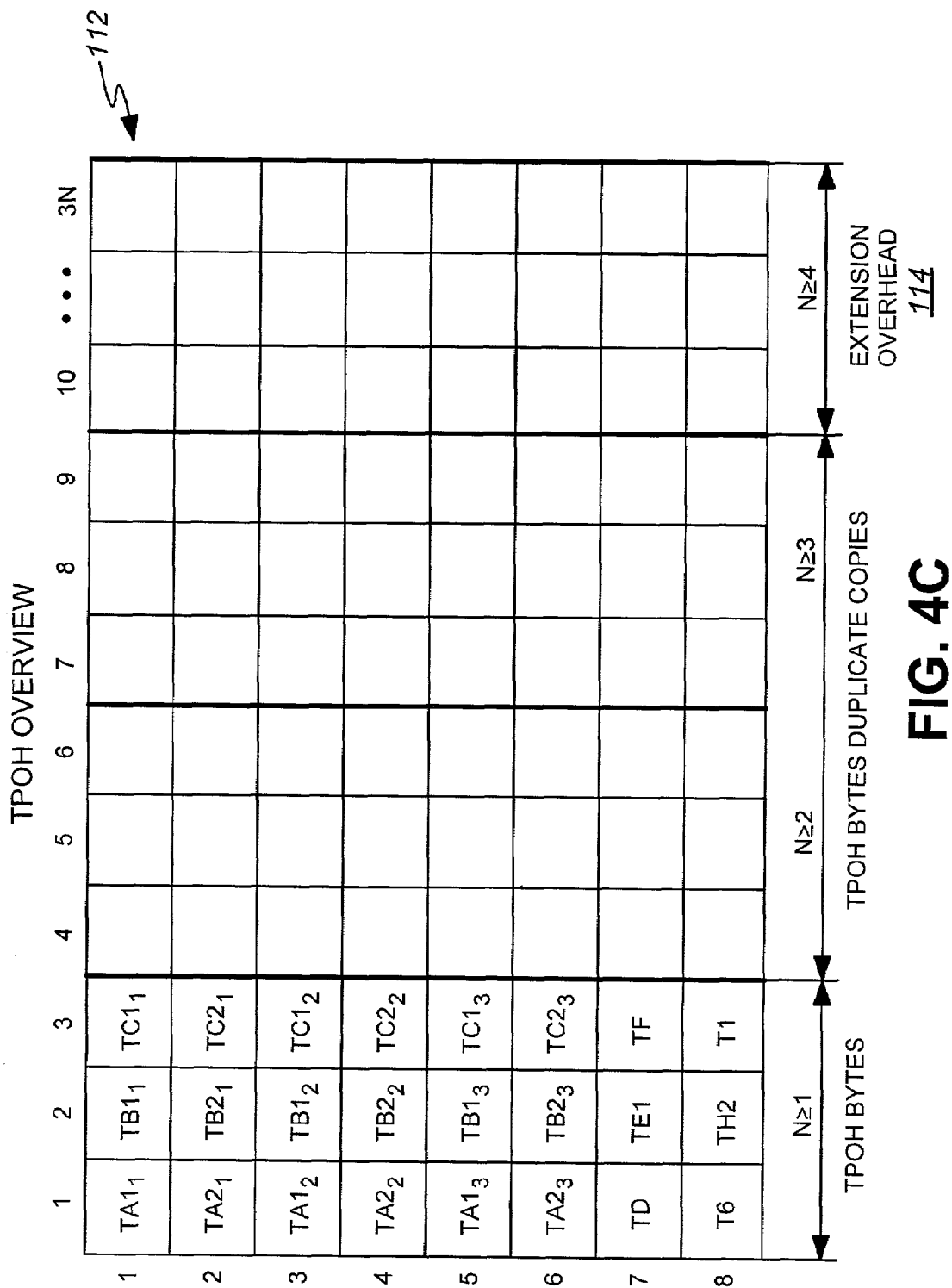
FIG. 4C shows a Transparent Packet Overhead (TPOH) that could be utilized within the TPE shown in FIG. 4B.

The TPE 110 comprises a Transparent Payload Overhead (TPOH) 112 and a Transparent Payload Container (TPC) 114. The TPOH 112, as described in more detail with reference to FIG. 4C, is carried in column 0 of the TPE 110 and consists of 8 rows of words (words 1, 130, 259, 388, 517, 646, 775, 904) which are 3N bytes long for the case of an STS-3Nc frame. The TPC 114 is carried at column 1, row 1 (word 2) of the TPE 110 (referred to as TPC0) and ends at column 128, row 8 (word 1032) of the TPE 110 (referred to as TPC1023) and is 1024 words in length.

It is noted that, in this embodiment, all of the 3N byte words are transmitted according to the SONET/SDH transmission order as per the standard G.707. For instance, an STS-12c frame will have a byte transmission order of 1, 4, 7, 10, 2, 5, 8, 11, 3, 6, 9, 12.

Figure 4D:
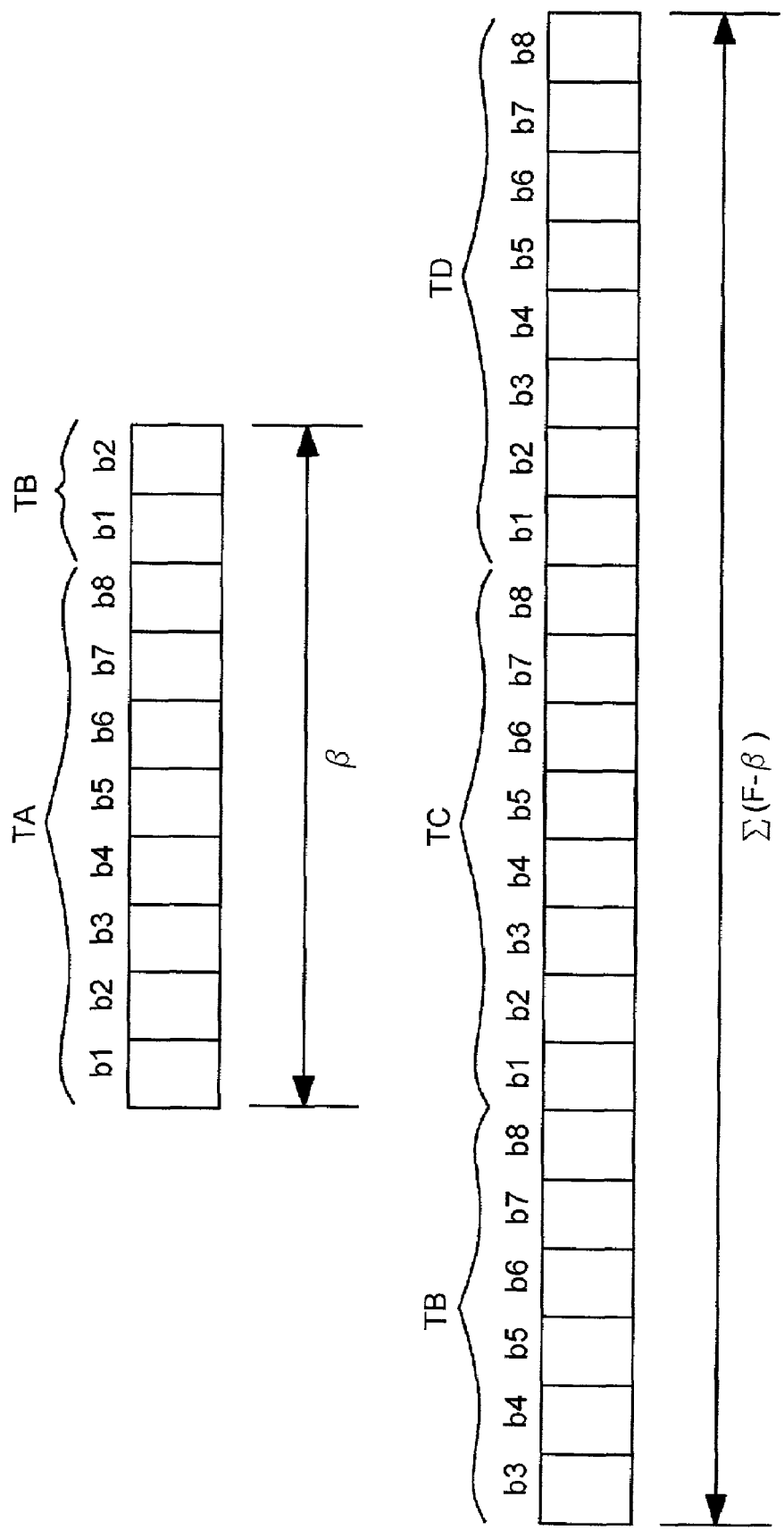
FIG. 4D shows the contents of the TA, TB, TC and TD bytes within the TPOH of FIG. 4C.

FIG. 4C illustrates an embodiment for the TPOH 112 of FIG. 4B. In this embodiment, the TPOH 112 carries nine bytes of overhead: TA, TB, TC, TD, TE, TF, TG, TH, TI. In this embodiment, as shown in FIG. 4D, bytes TA, TB, TC and TD carry the critical parameters of the stuff indicator β (10 bits total; TA and first 2 bits of TB) and a block relative frequency F encoded for transmission as $\Sigma(F-\beta)$ (22 bits total; last six bits of TB, TC and TD). In this embodiment, the stuff indicator β indicates the number of valid words in a TPE 110, except for β=0 which is taken to mean 1024 words (Zero words would be indicated by the path level AIS). In this embodiment, the stuff indicator β is transmitted during TPE frame N−1 to determine the bit spreading template for TPE frame N. The integral $\Sigma(F-\beta)$ is a 22-bit fixed point fraction which allows the value for the block relative frequency F to be transmitted in fewer bits. The block relative frequency F provides the frequency of the clock at the synchronizer to the desynchronizer in order that the relative frequency can be determined.

There are different levels of protection utilized for the bytes in the TPOH 112 as shown in FIG. 4C. In the embodiment of FIG. 4C, the level of protection/correction for the TA, TB and TC bytes is high while bytes TD, TE, TF, TG, TH and TI have less protection/correction. The TPOH uses (16,8) Bose-Chaudhuri-Hocquenghem (BCH) 1 coding followed by triple copies within each column (for majority voting) to protect bytes A, B, and C which carry critical overhead. Bytes TD, TE, TF, TG, TH, and TI are not covered by this coding procedure, however, for N>3, majority voting across byte columns 1 . . . 9 provides a level of protection to bytes TD, TE, TF, TG, TH and TI as well as a further level of protection for bytes TA, TB, and TC.

As shown in FIG. 4C, the bytes TA through TI are encoded into the 24 bytes of columns (1, 2, 3). In cases that N ≧2 (STS-6c and above), the 24 TPOH bytes from columns (1, 2, 3) are duplicated and stored in columns (6, 4, 5). In cases that N≧3 (STS-9c and above), the 24 bytes are further duplicated and stored in columns (8, 9, 7). In cases that N≧4 (STS-12c and above), additional columns 114 are reserved for future use. The byte column rotation of (1, 2, 3) into (6, 4, 5) and (8, 9, 7) allows the SONET byte transmission order to minimize errors in the specific case of STS-3c-Nv signals where one virtually concatenated signal is experiencing bit errors.

Figure 4E:
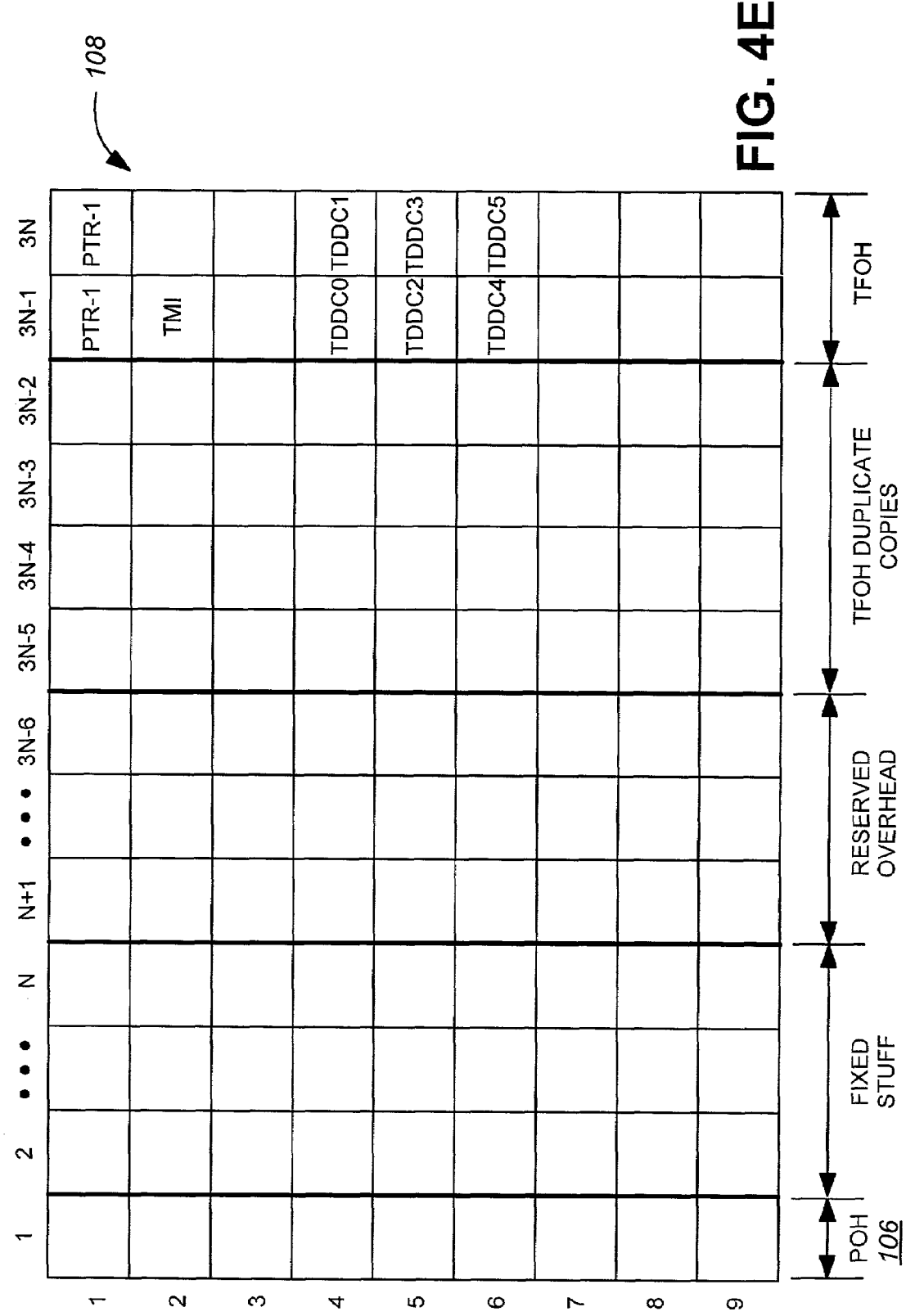
FIG. 4E shows the contents of the bytes of the TPOH of FIG. 4C.

Now turning to the POH 106 and TFOH 108 from FIG. 4A, FIG. 4E illustrates an embodiment for these overhead blocks. As illustrated, these overhead blocks comprise 3N columns by 9 rows of bytes (1 column by 9 rows of words, a word in this case of an STS-3Nc being of length 3N bytes). The POH 106 is provided within the first column while the TFOH bytes are provided in the final two columns (3N−1, 3N). For STS-6c, a single duplicate TFOH copy is located in byte columns (3N−3, 3N−2). For STS-9c and greater, two duplicate TFOH copies are located in byte columns (3N−5, 3N−4), and (3N−3, 3N−2) respectively. In cases that multiple copies of the TFOH are available, they are used to detect and correct possible bit errors in the TFOH bytes.

The TFOH columns (3N−1, 3N) contain a total of eighteen bytes, of which nine are specified on FIG. 4E; these being PTR-H, PTR-L, TMI and six Data Communication bytes. The PTR-High and PTR-Low bytes are reserved for use as pointers. A 16 bit pointer is formed by concatenating these bytes which points to the next start of frame for the TPE 110. The TMI byte is a single byte which specifies the version number of the transparent mapping interface. The six Data Communication bytes (TDDC0-TDDC5), in this particular embodiment, are defined to provide a 384 kb/s transparent data communications channel for internal management use between the transparent synchronizer and desynchronizer.

Figure 5:
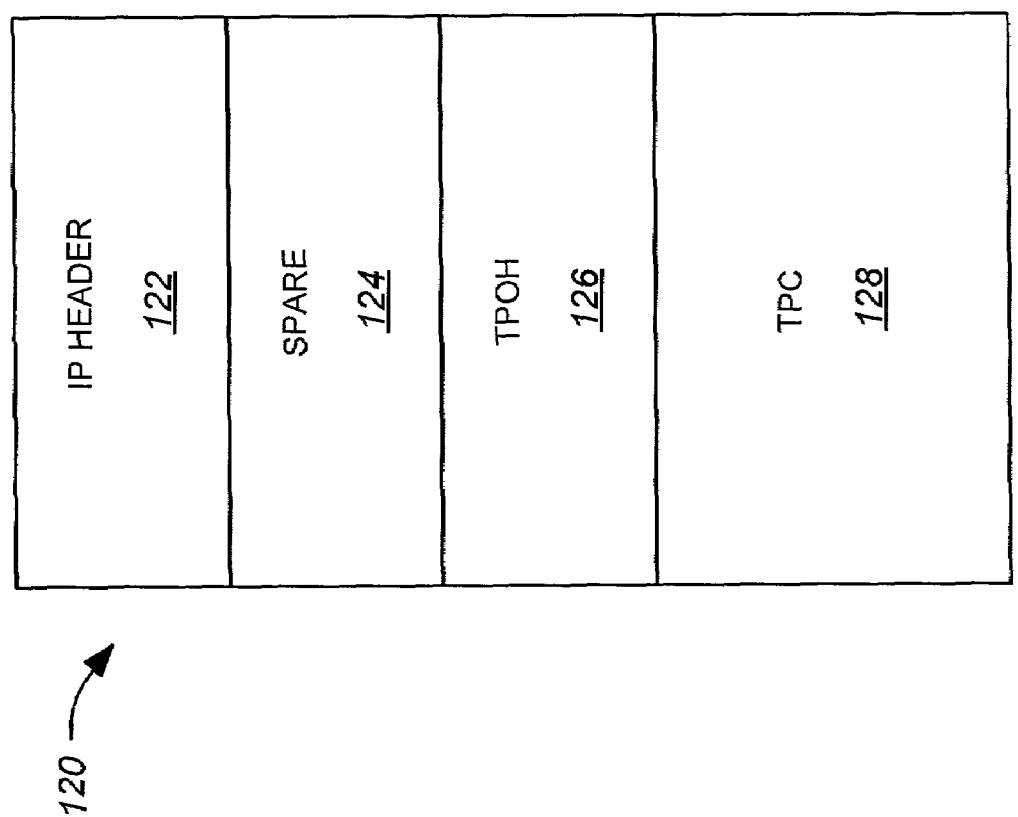
FIG. 5 is an Internet Protocol (IP) packet according to an embodiment of the invention.

The above description of the invention has been specific to transparent transportation of data signals within a synchronous format and specifically within a SONET frame. It should be understood that the format that is used, such as that described with reference to FIGS. 4A through 4E, could be modified for other asynchronous formats such as Internet Protocol (IP) packets or ATM data cells. FIG. 5 illustrates such a possible implementation within an IP packet 120. The IP packet 120 comprises a standard IP header 122, a spare section 124, a TPOH 126 and a TPC 128 (or a portion one or more TPCs if the packet size is limited). In this case, the TPOH 126 could be similar to the TPOH 108 described previously or could be slightly different such as not including much protection/correction, or duplication of control information, or even GAP words which are a requirement of circuit systems and not variable bit rate data systems. Further, it could be possible to transmit the stuff indicator p within the length byte of the IP header 122 and so the TPOH 126 would only be required to transmit the block relative frequency F. The TPC 128 could be similar to the TPC 114 or alternatively be of a different size.

While the invention has been described with reference to particular example embodiments, further modifications and improvements which will occur to those skilled in the art, amy be made within the purview of the appended claims, without departing from the scope of the invention in its broader aspect.

We claim:

1. A method for mapping a continuous format signal into at least one container signal to be transmitted via a network, the method comprising:
    distributing the bits of said continuous signal into a transparent envelope of length L words, the transparent envelope including overhead information within at least words A, A+B, A+2B. . . A+(r−1)B, wherein A, B, r are integers and L is greater than or equal to rB; and
    inserting the transparent envelope within a payload of at least one container signal.

2. A method according to claim 1, wherein A is equal to 1, B is equal to 129, r is equal to 8 and L is equal to 1032.

3. A method according to claim 1, wherein each of the words have a length of 3N bytes, N being an integer.

4. A method according to claim 1, wherein the inserting the transparent envelope within a payload of at least one container signal comprises inserting a first portion of the transparent envelope within a payload of a first container signal and inserting a second portion of the transparent envelope within a payload of a second container signal.

5. A method according to claim 4, wherein the first and second portions of the transparent envelope together comprise the entire transparent envelope.

6. A method according to claim 4, wherein the inserting the transparent envelope within a payload of at least one container signal further comprises inserting a third portion of the transparent envelope on a payload of a third container signal.

7. A method according to claim 4, wherein the first and second container signals are fixed length synchronous signals, and the network is a synchronous network.

8. A method according to claim 4, wherein the first and second container signals are SONET/SDH signals, and the network is a SONET/SDH network.

9. A method according to claim 4, wherein the first and second container signals are asynchronous signals, and the network is an asynchronous network.

10. A method according to claim 4, wherein the first and second container signals are Internet Protocol (IP) packets, and the network is an IP network.

11. A method according to claim 1, wherein A is equal to 1, B is equal to 129, r is equal to 8, L is equal to 1032 and each of the words have a length of 3N bytes, N being an integer; and
    wherein the inserting the transparent envelope within a payload of at least one container signal comprises inserting a first portion of the transparent envelope within a payload of a first SONET/SDH signal and inserting a second portion of the transparent envelope within a payload of a second SONET/SDH signal, the first and second portions of the transparent envelope together comprising the entire transparent envelope.

12. A method according to claim 1, wherein the overhead information comprises stuff control information.

13. A method according to claim 1, wherein the overhead information comprises information with respect to a clock frequency for transmission.

14. A method according to claim 1, wherein the overhead information comprises stuff control bits and bits representative of an integration of the stuff control bits and bits representing a clock frequency for transmission.

15. A method according to claim 14, wherein at least a portion of the stuff control bits and the bits representative of the integration are encrypted with forward error correction coding.

16. A method according to claim 1, wherein the payload of the container signal further comprises a Transparent Fixed Overhead (TFOH).

17. A method according to claim 16, wherein the TFOH comprises a pointer to be used with respect to the transparent envelope.

18. A method according to claim 16, wherein the TFOH comprises an indication with respect to the type of mapping that has been performed within the transparent envelope.

19. A method according to claim 16, wherein the TFOH comprises a data communication channel.

20. A method according to claim 1, wherein A is equal to 1, B is equal to 129, r is equal to 8, L is equal to 1032 and each of the words have a length of 3N bytes, N being an integer.

21. A method according to claim 1, wherein the container signal includes one portion of a plurality of portions of the transparent envelope.

22. A method according to claim 1, wherein the container signal is a SONET/SDH signal.

23. A method according to claim 1, wherein the container signal is an Internet Protocol (IP) packet.

24. A method according to claim 1, wherein the overhead information comprises stuff control bits and bits representative of a clock frequency for transmission.

25. A method according to claim 1, wherein the payload of the container signal comprises a Transparent Fixed Overhead (TFOH), the TFOH comprising at least one of a pointer to be used with respect to the transparent envelope, an indication with respect to the type of mapping that has been performed within the transparent envelope and a data communication channel.

26. An apparatus for mapping a continuous format signal into one or more container signal to be transmitted via a network, the apparatus comprising:
   a data recovery unit for receiving said continuous format signal and recovering a stream of data bits;
   a mapping unit for receiving said stream of data bits and distributing the bits of said continuous signal into a transparent envelope of length L words, the transparent envelope including overhead information within at least words A, A+B, A2B ... A+(r−1)B, wherein A, B, r are integers and L is greater than or equal to rB; and
   a container unit for receiving the transparent envelope and inserting the words of the transparent envelope within a payload of one or more container signals.

27. An apparatus according to claim 26, wherein A is equal to 1, B is equal to 129, r is equal to 8 and L is equal to 1032.

28. An apparatus according to claim 26, wherein each of the words have a length of 3N bytes, N being an integer.

29. An apparatus according to claim 26, wherein to insert the words of the transparent envelope within one or more container signals, the container inserts a first portion of the transparent envelope within a payload of a first container signal and inserts a second portion of the transparent envelope within a payload of a second container signal.

30. An apparatus according to claim 26, wherein the first and second container signals are fixed length synchronous signals, and the network is a synchronous network.

31. An apparatus according to claim 30, wherein the first and second container signals are SONET/SDH signals, and the network is a SONET/SDH network.

32. An apparatus according to claim 26, wherein the first and second container signals are asynchronous signals, and the network is an asynchronous network.

33. An apparatus according to claim 32, wherein the first and second container signals are Internet Protocol (IP) packets, and the network is an IP network.

34. An apparatus according to claim 26, wherein the overhead information comprises stuff control information and information with respect to a clock frequency for transmission.

35. An apparatus according to claim 26, wherein the payload of the container signal further comprises a Transparent Fixed Overhead (TFOH), the TFOH comprising at least one of a pointer to be used with respect to the transparent envelope, an indication with respect to the type of mapping that has been performed within the transparent envelope and a data communication channel.

36. A method for mapping a continuous format signal into a transparent envelope, the method comprising:
   distributing the bits of said continuous signal into a transparent envelope of length 1032 words, the transparent envelope including overhead information within at least words 1, 130 and 259, each of the words having a length of 3N bytes, N being an integer.

* * * * *